US012619328B2

(12) United States Patent
Yuk et al.

(10) Patent No.: US 12,619,328 B2
(45) Date of Patent: May 5, 2026

(54) ELECTRONIC DEVICE

(71) Applicant: Samsung Display Co., Ltd., Yongin-Si (KR)

(72) Inventors: Bogeun Yuk, Yongin-si (KR); Min-Hong Kim, Yongin-si (KR); Mi-Ae Park, Yongin-si (KR); Jungmok Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/676,505

(22) Filed: May 29, 2024

(65) Prior Publication Data

US 2025/0077033 A1 Mar. 6, 2025

(30) Foreign Application Priority Data

Aug. 31, 2023 (KR) ........................ 10-2023-0115044

(51) Int. Cl.
| | |
|---|---|
| *G06F 3/044* | (2006.01) |
| *G06F 3/041* | (2006.01) |
| *G06F 3/047* | (2006.01) |

(52) U.S. Cl.
CPC ........ *G06F 3/04164* (2019.05); *G06F 3/0412* (2013.01); *G06F 3/041662* (2019.05); *G06F 3/0443* (2019.05); *G06F 3/0446* (2019.05); *G06F 3/047* (2013.01); *G06F 2203/04107* (2013.01)

(58) Field of Classification Search
CPC .............. G06F 3/0412; G06F 3/04164; G06F 3/041662; G06F 3/0433; G06F 3/0446; G06F 2203/04107; G06F 3/0418; G06F 3/047
See application file for complete search history.

(56) References Cited

U.S. PATENT DOCUMENTS

| | | | |
|---|---|---|---|
| 10,521,058 B2 | 12/2019 | Lee et al. | |
| 11,036,325 B2* | 6/2021 | Lee ...................... | H10K 59/131 |
| 11,099,683 B1* | 8/2021 | Kagase .............. | G06F 3/04164 |
| 2022/0256706 A1 | 8/2022 | Xiong et al. | |
| 2025/0068283 A1* | 2/2025 | Kim ................... | G06F 3/04184 |

FOREIGN PATENT DOCUMENTS

| | | |
|---|---|---|
| JP | 7221618 B2 | 2/2023 |
| KR | 10-2022-0146406 A | 11/2022 |
| KR | 10-2477813 B1 | 12/2022 |

* cited by examiner

*Primary Examiner* — Julie Anne Watko
(74) *Attorney, Agent, or Firm* — Innovation Counsel LLP

(57) ABSTRACT

Disclosed is an electronic device including a display layer, and a sensor layer, wherein the sensor layer includes a plurality of first sensing electrodes including one end and the other end, a plurality of second sensing electrodes, a plurality of first trace lines and a plurality of second trace lines connected the plurality of first sensing electrodes, and a plurality of third trace lines connected to the plurality of second sensing electrodes, respectively, wherein the sensor layer operates in a self-touch scheme during a first section of a sensing frame, wherein a driving signal is provided only to the plurality of first trace lines and the plurality of third trace lines during the first section of the sensing frame.

20 Claims, 9 Drawing Sheets

ELECTRONIC DEVICE

CROSS-REFERENCE TO RELATED APPLICATIONS

This application claims priority under 35 U.S.C. § 119 to Korean Patent Application No. 10-2023-0115044 filed on Aug. 31, 2023, in the Korean Intellectual Property Office, the disclosures of which are incorporated by reference herein in their entireties.

BACKGROUND

Embodiments of the present disclosure described herein relate to an electronic device with improved sensing reliability.

Multimedia electronic devices such as a television, a mobile phone, a tablet computer, a navigation system, a game console, and the like are equipped with an electronic device for displaying an image. The electronic devices may have a sensor layer that may provide a touch-based input scheme that allows a user to easily, intuitively, and conveniently input information or commands, in addition to a typical input scheme such as a button, a keyboard, a mouse, and the like. The sensor layer may sense whether a user's body has made a touch input.

SUMMARY

Embodiments of the present disclosure provide an electronic device with improved sensing reliability.

According to an embodiment, an electronic device includes a display layer, and a sensor layer that is disposed on the display layer and includes an active area and a peripheral area disposed adjacent to the active area, the sensor layer includes a plurality of first sensing electrodes extending along a first direction, each of the plurality of first sensing electrodes including one end and the other end spaced apart from each other in the first direction, a plurality of second sensing electrodes extending along the second direction intersecting the first direction, a plurality of first trace lines, each of the plurality of the first trace lines being electrically connected to the one end of each of at least some of the plurality of first sensing electrodes, a plurality of second trace lines, each of the plurality of the second trace lines being electrically connected to the other end of each of a remainder of the plurality of first sensing electrodes, and a plurality of third trace lines electrically connected to the plurality of second sensing electrodes, respectively, the plurality of first sensing electrodes and the plurality of second sensing electrodes operate in a self-touch scheme during the first section of the sensing frame, and a driving signal is provided only to the plurality of first trace lines and the plurality of third trace lines during the first section of the sensing frame.

The electronic device may further include a data driver that drives the display layer, a sensor driver that drives the sensor layer, and a display signal line electrically connected to the data driver and transmitting a signal for controlling the display layer, the sensor driver may be electrically connected to the plurality of second trace lines, and the plurality of second trace lines may be overlapped with the display signal line in a plan view.

The sensor driver may be electrically connected to the plurality of first trace lines, and the plurality of first trace lines may not be overlapped with the display signal line in a plan view.

The sensor driver may be electrically connected to the plurality of third trace lines, and the plurality of third trace lines may not be overlapped with the display signal line in a plan view.

The electronic device may further include a flexible circuit board electrically connected to the display layer and the sensor layer, and the display signal line and the sensor driver may be disposed on the flexible circuit board.

The plurality of first trace lines may include first-first lines each connected to the one end of each of at least some of the plurality of first sensing electrodes, and first-second lines extending respectively from the first-first lines and connected to the sensor driver, the first-first lines may be arranged in the peripheral area, and the first-second lines may be arranged on the flexible circuit board.

The plurality of first sensing electrodes and the plurality of second sensing electrodes may be driven in a mutual-touch scheme during a second section of the sensing frame following the first section of the sensing frame.

A transmission signal may be provided to the plurality of first trace lines and the plurality of second trace lines during the second section, and a reception signal generated based on the transmission signal may be provided to the plurality of third trace lines.

The at least some of the plurality of first sensing electrodes and the remainder of the plurality of first sensing electrodes may be alternately arranged along the second direction.

A portion of each of the plurality of first trace lines may be disposed at one side of the peripheral area.

A portion of each of the plurality of second trace lines may be disposed at the other side of the peripheral area which is spaced apart from the one side of the peripheral area in the first direction.

A portion of each of the plurality of third trace lines may be disposed adjacent to the portion of each of the plurality of first trace lines.

According to an embodiment, an electronic device includes a display layer, a data driver that drives the display layer, a sensor layer that is disposed on the display layer, a sensor driver that drives the sensor layer, and a display signal line electrically connected to the data driver, the sensor layer includes a plurality of first sensing electrodes extending along a first direction each of the plurality of first sensing electrodes including one end and the other end spaced apart from each other in the first direction, a plurality of first trace lines, each of the plurality of first trace lines being electrically connected to one end of each of at least some of the plurality of first sensing electrodes, and a plurality of second trace lines, each of the plurality of second trace lines being electrically connected to the other end of each of a remainder of the plurality of first sensing electrodes, the plurality of first trace lines and the plurality of second trace lines are connected to the sensor driver, the plurality of second trace lines are overlapped with the display signal line in a plan view, the plurality of first trace lines are not overlapped with the display signal line in a plan view, and a driving signal is provided to the plurality of first trace lines during a first section of a sensing frame.

The at least some of the plurality of first sensing electrodes and the remainder of the plurality of first sensing electrodes may be alternately arranged.

The electronic device may further include a flexible circuit board electrically connected to the display layer and the sensor layer, and the display signal line and the sensor driver may be disposed on the flexible circuit board.

The sensor layer may further include a plurality of second sensing electrodes extending along a second direction intersecting the first direction, and a plurality of third trace lines electrically connected to the plurality of second sensing electrodes, respectively, and the driving signal may be provided to the plurality of third trace lines during the first section.

The plurality of first sensing electrodes and the plurality of second sensing electrodes may operate in a self-touch scheme during the first section.

The plurality of third trace lines may be spaced apart from the display signal line in a plan view.

The sensing frame may further include a second section following the first section, and the plurality of first sensing electrodes and the plurality of second sensing electrodes may be driven in a mutual-touch scheme during the second section.

A transmission signal may be provided to the plurality of first trace lines and the plurality of second trace lines during the second section and a reception signal generated based on the transmission signal may be provided to the plurality of third trace lines.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
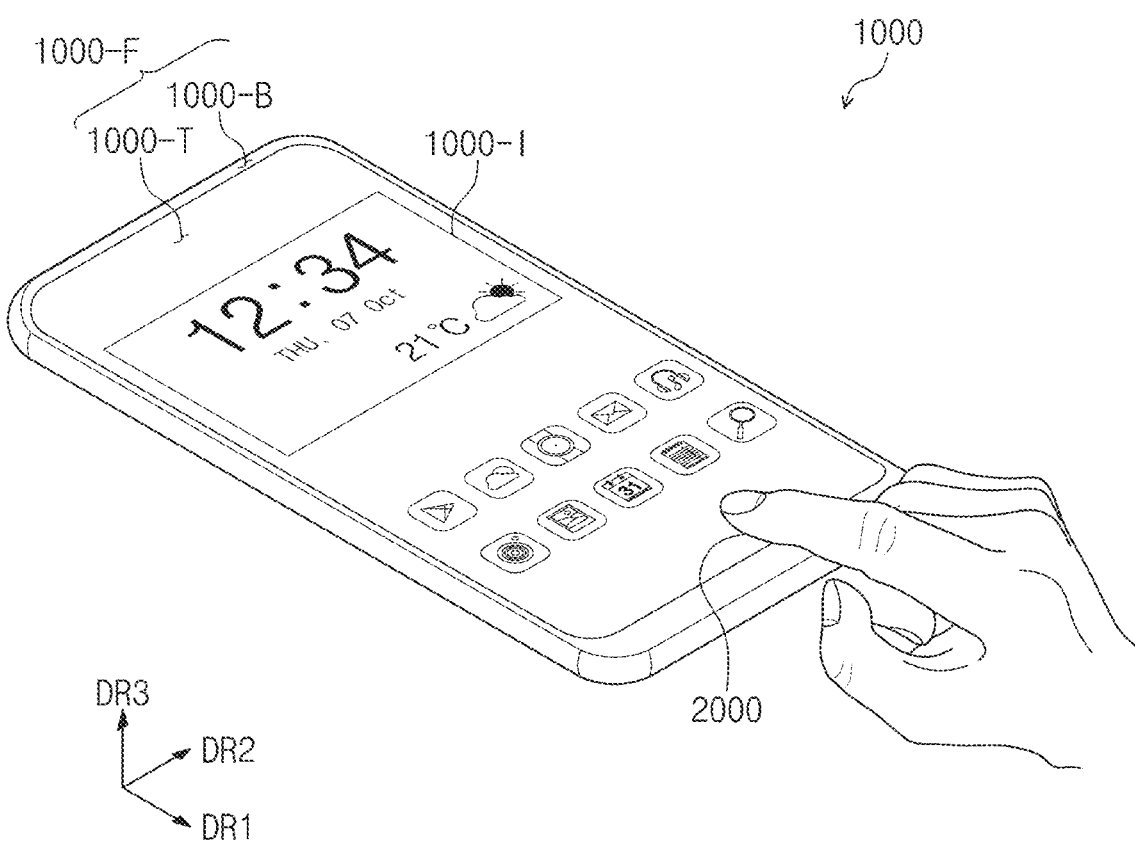
FIG. 1 is a perspective view of an electronic device according to an embodiment of the present disclosure.

As used herein, when a component (or a region, a layer, a portion, and the like) is referred to as being "on", "connected to", or "coupled to" another component, it means that the component may be directly disposed/connected/coupled on another component or a third component may be disposed between the component and another component.

Like reference numerals refer to like components. In addition, in the drawings, thicknesses, ratios, and dimensions of components are exaggerated for effective description of technical content. "and/or" includes all of one or more combinations that the associated components may define.

Terms such as first, second, and the like may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to the drawings.

FIG. 1 is a perspective view of an electronic device according to an embodiment of the present disclosure.

Referring to FIG. 1, an electronic device 1000 may be a device that is activated in response to an electrical signal. The electronic device 1000 may include various embodiments. For example, the electronic device 1000 may be used not only for a large electronic device such as a television, a monitor, or an external billboard, but also a small and medium-sized electronic device such as a personal computer, a laptop computer, a personal digital terminal, a vehicle navigation unit, a game console, a portable electronic device, and a camera. Additionally, these are merely presented as embodiments, and the electronic device 1000 may also be employed in other electronic devices without deviating from the concept of the present disclosure. In the present embodiment, the electronic device 1000 is shown as a smartphone as an example.

The electronic device 1000 may include a display surface 1000-F parallel to each of a first direction DR1 and a second direction DR2 intersecting the first direction DR1. The display surface 1000-F may include a transmissive area 1000-T and a bezel area 1000-B.

An image 1000-I may be displayed in a third direction DR3 in the transmissive area 1000-T. The third direction DR3 may be a thickness direction. The image 1000-I may include a still image as well as a dynamic image. In FIG. 1, a clock and icons are shown as an example of the image 1000-I. The display surface 1000-F on which the image 1000-I is displayed may correspond to a front surface of the electronic device 1000.

In the present embodiment, a front surface (or a top surface) and a rear surface (or a bottom surface) of each member may be defined based on the direction in which the image 1000-I is displayed. The front surface and the rear surface may be opposite to each other in the third direction DR3, and normal directions of the respective front and rear surfaces may be parallel to the third direction DR3. As used herein, "when viewed on a plane" may mean "when viewed in the third direction DR3".

The image 1000-I may not be displayed in the bezel area 1000-B.

The electronic device 1000 according to one embodiment of the present disclosure may sense an input of a user applied from the outside. For example, the electronic device 1000 may sense a user's body 2000 applied from the outside. The input of the user may include various types of external inputs, such as a user's body part, light, heat, or a pressure. Additionally, the electronic device 1000 may sense an input applied to a side surface or a rear surface of the electronic device 1000 depending on a structure of the electronic device 1000, and may not be limited to any one embodiment.

Figure 2:
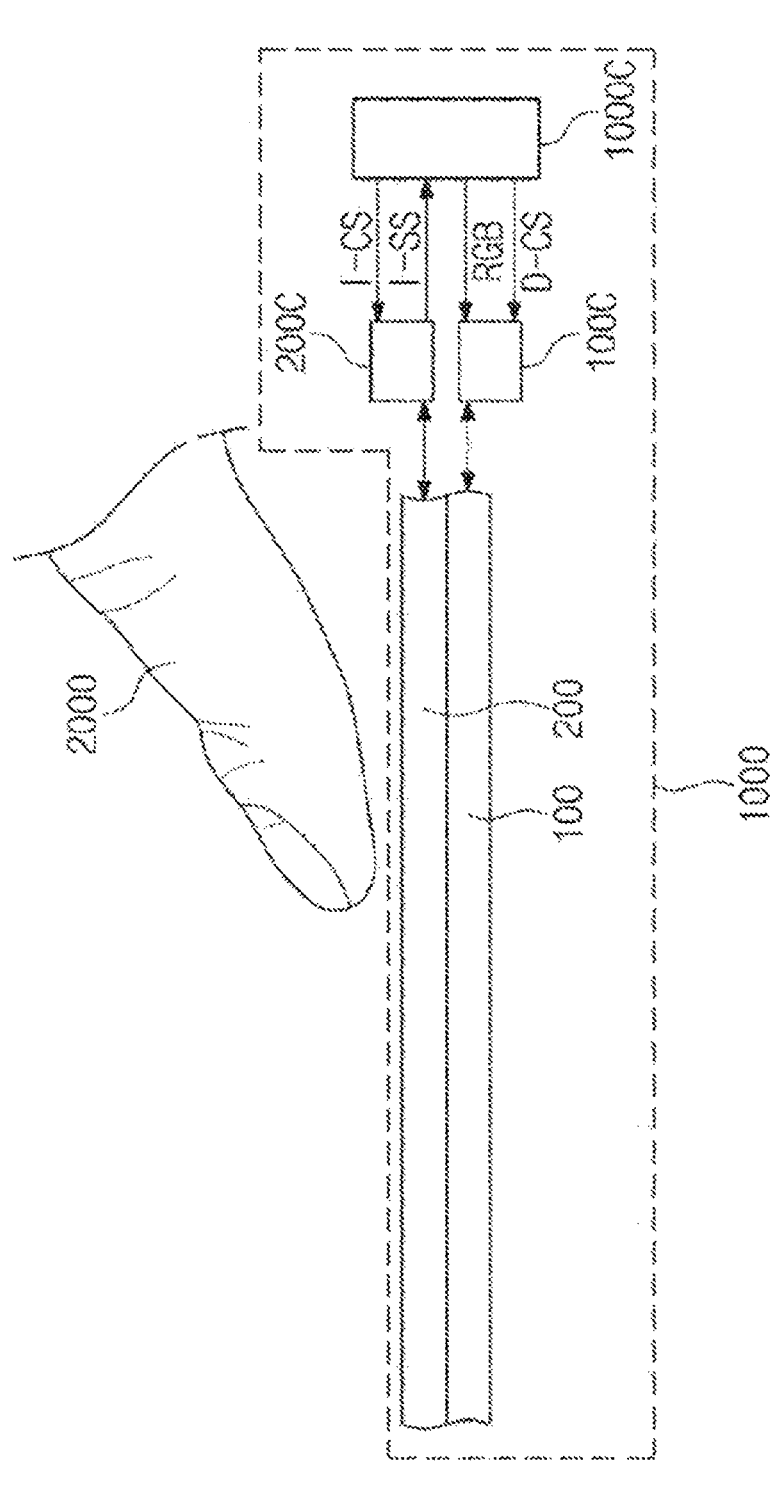
FIG. 2 is a block diagram schematically showing an electronic device according to an embodiment of the present disclosure.

FIG. 2 is a block diagram schematically showing an electronic device according to an embodiment of the present disclosure.

Referring to FIG. 2, the electronic device 1000 may include a display layer 100, a sensor layer 200, a display driver 100C, a sensor driver 200C, and a controller 1000C. The display layer 100 may be a component that actually displays the image.

The display layer 100 may be a light emitting display layer, but may not be particularly limited. For example, the display layer 100 may be an organic light emitting display layer, a quantum dot display layer, a micro LED display layer, or a nano LED display layer. A light emitting layer of the organic light emitting display layer may contain an organic light emitting material. A light emitting layer of the quantum dot display layer may contain quantum dots and quantum rods. A light emitting layer of the micro LED display layer may contain a micro LED. A light emitting layer of the nano LED display layer may contain a nano LED.

The sensor layer 200 may be disposed on the display layer 100. The sensor layer 200 may sense an external input applied from the outside. The sensor layer 200 may sense the external input from the user's body 2000.

The controller 1000C may control overall operation of the electronic device 1000. For example, the controller 1000C may control operation of the display driver 100C and the sensor driver 200C. The controller 1000C may include at least one microprocessor and the controller 1000C may be referred to as a host.

The display driver 100C may control the display layer 100. The controller 1000C may further include a graphics controller. The display driver 100C may receive image data RGB and a control signal D-CS from the controller 1000C. The control signal D-CS may include various signals. For example, the control signal D-CS may include an input vertical synchronization signal, an input horizontal synchronization signal, a main clock, a data enable signal, and the like.

The display driver 100C may generate a vertical synchronization signal and a horizontal synchronization signal for controlling timing of providing a signal to the display layer 100 based on the control signal D-CS.

The sensor driver 200C may control the sensor layer 200. The sensor driver 200C may receive a control signal I-CS from the controller 1000C. The control signal I-CS may include a clock signal.

The sensor driver 200C may calculate coordinate information of the external input based on a signal received from the sensor layer 200 and provide a coordinate signal I-SS including the coordinate information to the controller 1000C. The controller 1000C may execute an operation corresponding to the input of the user based on the coordinate signal I-SS. For example, the controller 1000C may operate the display driver 100C such that a new application image is displayed on the display layer 100 based on the coordinate signal I-SS.

Figure 3A:
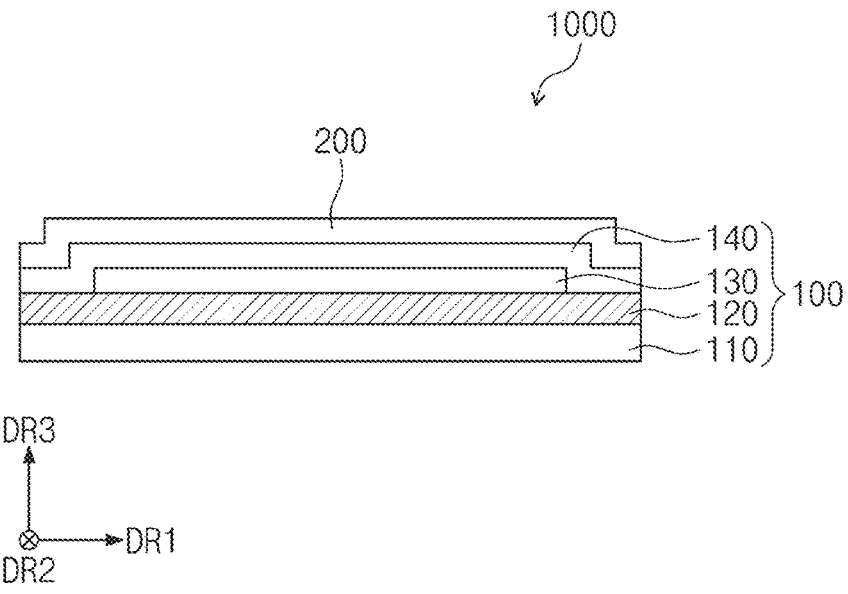
FIG. 3A is a cross-sectional view of an electronic device according to an embodiment of the present disclosure.

FIG. 3A is a cross-sectional view of an electronic device according to an embodiment of the present disclosure.

Referring to FIG. 3A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member that provides a surface on which the circuit layer 120 is disposed. The base layer 110 may be a glass substrate, a metal substrate, or a polymer substrate. However, the embodiment may not be limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may contain a polyimide-based resin. In addition, each of the first and second synthetic resin layers may contain at least one of an acrylate-based resin, a methacrylate-based resin, a poly-isoprene-based resin, a vinyl (vLCyl)-based resin, an epoxy-based resin, a urethane-based resin, a cellulose-based resin, a siloxane-based resin, a polyamide-based resin, and a perylene-based resin. In one example, herein, a "~~"-based resin may mean one including a "~~" functional group.

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 via coating, deposition, and the like, and then the insulating layer, the semiconductor layer, and the conductive layer may be selectively patterned via a plurality of photolithography processes. Thereafter, the semiconductor pattern, the conductive pattern, and the signal line included in the circuit layer 120 may be formed.

The light emitting element layer 130 may be disposed on the circuit layer 120. The light emitting element layer 130 may contain a light emitting element. For example, the light emitting element layer 130 may contain the organic light emitting material, the quantum dots, the quantum rods, the micro LED, or the nano LED.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be formed on the display layer 100 via a continuous process. In this case, the sensor layer 200 may be disposed directly on the display layer 100. The direct disposition may mean that a third component is not disposed between the sensor layer 200 and the display layer 100. That is, a separate adhesive member may not be disposed between the sensor layer 200 and the display layer 100. Alternatively, the sensor layer 200 may be coupled to the display layer 100 via the adhesive member. The adhesive member may include an existing adhesive or a gluing agent.

Figure 3B:
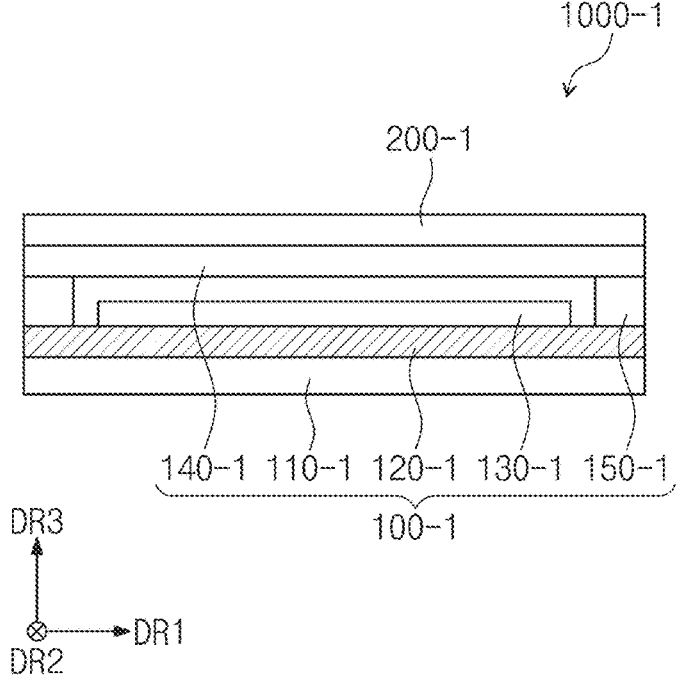
FIG. 3B is a cross-sectional view of an electronic device according to an embodiment of the present disclosure.

FIG. 3B is a cross-sectional view of an electronic device according to an embodiment of the present disclosure.

Referring to FIG. 3B, an electronic device 1000-1 may include a display layer 100-1 and a sensor layer 200-1. The display layer 100-1 may include a base layer 110-1, a circuit layer 120-1, a light emitting element layer 130-1, an encapsulation substrate 140-1, and a coupling member 150-1.

Each of the base layer 110-1 and the encapsulation substrate 140-1 may be a glass substrate, a metal substrate, a polymer substrate, or the like, but may not be particularly limited thereto.

The coupling member 150-1 may be disposed between the base layer 110-1 and the encapsulation substrate 140-1. The coupling member 150-1 may couple the encapsulation substrate 140-1 to the base layer 110-1 or the circuit layer 120-1. The coupling member 150-1 may contain an inorganic material or an organic material. For example, the inorganic material may include a frit seal, and the organic material may include a photo-curable resin or a photo-plastic resin. However, the material constituting the coupling member 150-1 is not limited to the above example.

The sensor layer 200-1 may be disposed directly on the encapsulation substrate 140-1. The direct disposition may mean that a third component is not disposed between the sensor layer 200-1 and the encapsulation substrate 140-1. That is, a separate adhesive member may not be disposed between the sensor layer 200-1 and the display layer 100-1. However, the present disclosure may not be limited thereto, and an adhesive layer may be further disposed between the sensor layer 200-1 and the encapsulation substrate 140-1.

Figure 4:
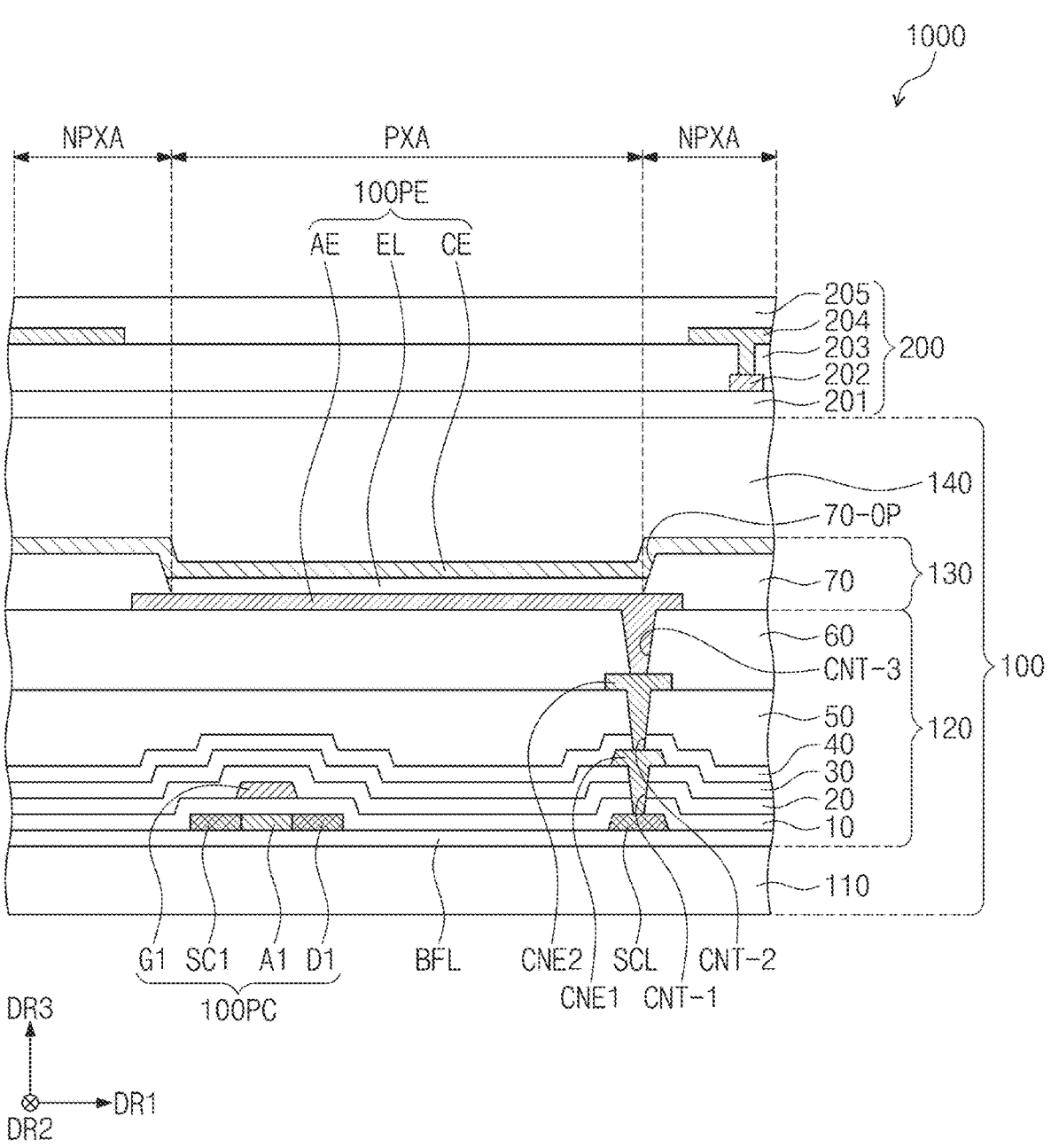
FIG. 4 is a cross-sectional view of an electronic device according to an embodiment of the present disclosure.

FIG. 4 is a cross-sectional view of an electronic device according to an embodiment of the present disclosure. In describing FIG. 4, the same reference numerals are used for the components described in FIG. 3A and a description thereof is omitted.

Referring to FIG. 4, at least one inorganic layer may be formed on a top surface of the base layer 110. The inorganic layer may contain at least one of aluminum oxide, titanium oxide, silicon oxide, silicon oxynitride, zirconium oxide, and hafnium oxide. The inorganic layer may be formed in multiple layers. The multiple inorganic layers may constitute a barrier layer and/or a buffer layer. In the present embodiment, the display layer 100 includes a buffer layer BFL.

The buffer layer BFL may improve a bonding strength between the base layer 110 and the semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may contain polysilicon. However, without being limited thereto, the semiconductor pattern may include amorphous silicon, low-temperature polycrystalline silicon, or oxide semiconductor.

FIG. 4 only illustrates a portion of the semiconductor pattern, and the semiconductor pattern may further be disposed in another area. The semiconductor pattern may be arranged in a specific order across pixels. Electrical properties of the semiconductor pattern may vary depending on a doping concentration. The semiconductor pattern may include a first area with high conductivity and a second area with low conductivity. The first area may be doped with an N-type dopant or a P-type dopant. A P-type transistor may include a doped area doped with the P-type dopant, and an N-type transistor may include a doped area doped with the N-type dopant. The second area may be an undoped area or may be doped at a concentration smaller than that of the first area.

The conductivity of the first area may be greater than that of the second area, and the first area may substantially serve as an electrode or a signal line. The second area may substantially correspond to an active (or a channel) of the transistor. In other words, a portion of the semiconductor pattern may be the active of the transistor, another portion thereof may be a source or a drain of the transistor, and still another portion thereof may be a connection electrode or a connection signal line.

Each of the pixels may have an equivalent circuit including seven transistors, one capacitor, and a light emitting element, and the equivalent circuit of the pixel may be modified into various forms. FIG. 4 shows one transistor 100PC and a light emitting element 100PE included in the pixel as an example.

The transistor 100PC may include a source SC1, an active A1, a drain D1, and a gate G1. The source SC1, the active A1, and the drain D1 may be formed of the semiconductor pattern. The source SC1 and the drain D1 may extend in opposite directions from the active A1 in a cross-section. FIG. 4 shows a portion of a connection signal line SCL formed from the semiconductor pattern. Although not separately shown, the connection signal line SCL may be electrically connected to the drain D1 of the transistor 100PC in a plan view.

A first insulating layer 10 may be disposed on the semiconductor pattern on the buffer layer BFL. The first insulating layer 10 may commonly overlap the plurality of pixels and may cover the semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, and hafnium oxide. In the present embodiment, the first insulating layer 10 may be a single silicon oxide layer. The first insulating layer 10 as well as the insulating layer of the circuit layer 120 to be described later may be an inorganic layer and/or an organic layer and may have a single-layer or multi-layer structure. The inorganic layer may contain at least one of the above-mentioned materials, but the present disclosure may not be limited thereto.

The gate G1 is disposed on the first insulating layer 10. The gate G1 may be a portion of a conductive layer, for example, a metal pattern. The gate G1 may overlap the active A1. In the process of doping the semiconductor pattern, the gate G1 may function as a self-aligned mask.

A second insulating layer 20 may be disposed on the first insulating layer 10 and may cover the gate G1. The second insulating layer 20 may commonly overlap the pixels. The second insulating layer 20 may be an inorganic layer and/or an organic layer, and may have a single-layer or multi-layer structure. The second insulating layer 20 may contain at least one of silicon oxide, silicon nitride, and silicon oxynitride. In the present embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have the multi-layer structure including a silicon oxide layer and a silicon nitride layer.

A first connection electrode CNE1 may be disposed on the third insulating layer 30. The first connection electrode CNE1 may be connected to the connection signal line SCL via a contact hole CNT-1 formed through the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include a light emitting element 100PE. For example, the light emitting element layer 130 may include the organic light emitting material, the quantum dots, the quantum rods, the micro LED, or the nano LED.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 via a contact hole CNT-3 formed through the sixth insulating layer 60.

A pixel defining film 70 may be disposed on the sixth insulating layer 60 and may cover a portion of the first electrode AE. An opening 70-OP is defined in the pixel defining film 70. The opening 70-OP of the pixel defining film 70 exposes at least a portion of the first electrode AE.

The transmissive area 1000-T (see FIG. 1) may include a light emitting area PXA and a non-light emitting area NPXA disposed adjacent to the light emitting area PXA. The non-light emitting area NPXA may surround the light emitting area PXA. In the present embodiment, the light emitting area PXA is defined to correspond to the partial area of the first electrode AE exposed by the opening 70-OP.

The light emitting layer EL may be disposed on the first electrode AE. The light emitting layer EL may be disposed in an area corresponding to the opening 70-OP. That is, the light emitting layer EL may be formed separately in each pixel. When the light emitting layer EL is formed separately in each pixel, each light emitting layer EL may emit light of at least one color among blue, red, and green. However, the present disclosure may not be limited thereto, and the light emitting layer EL may be connected to and commonly provided for the pixels. In this case, the light emitting layer EL may provide the blue light or white light.

The second electrode CE may be disposed on the light emitting layer EL. The second electrode CE may have an integral shape and may be commonly disposed in the plurality of pixels.

Although not shown, a hole control layer may be disposed between the first electrode AE and the light emitting layer EL. The hole control layer may be commonly disposed in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electronic control layer may be commonly formed in the plurality of pixels using an open mask.

The encapsulation layer 140 may be disposed on the light emitting element layer 130. The encapsulation layer 140 may include an inorganic layer, an organic layer, and an inorganic layer sequentially stacked, but the layers constituting the encapsulation layer 140 may not be limited thereto.

The inorganic layers may protect the light emitting element layer 130 from moisture and oxygen, and the organic layer may protect the light emitting element layer 130 from the foreign substances such as the dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but may not be limited thereto.

The sensor layer 200 may be formed on the display layer 100 via a continuous process. In this case, the sensor layer 200 may be disposed directly on the display layer 100. The direct disposition may mean that a third component is not disposed between the sensor layer 200 and the display layer 100. That is, a separate adhesive member may not be disposed between the sensor layer 200 and the display layer 100. Alternatively, the sensor layer 200 may be coupled to the display layer 100 via the adhesive member. The adhesive member may include an existing adhesive or gluing agent.

The sensor layer 200 may include a base insulating layer 201, a first conductive layer 202, a sensing insulating layer 203, a second conductive layer 204, and a cover insulating layer 205.

The base insulating layer 201 may be an inorganic layer containing at least one of silicon nitride, silicon oxynitride, and silicon oxide. Alternatively, the base insulating layer 201 may be an organic layer containing an epoxy resin, an acrylic resin, or an imide-based resin. The base insulating layer 201 may have a single-layer structure or a structure with multiple layers stacked along the third direction DR3.

Each of the first conductive layer 202 and the second conductive layer 204 may have a single-layer structure or a structure with multiple layers stacked along the third direction DR3.

The conductive layer with the single-layer structure may include a metal layer or a transparent conductive layer. The metal layer may contain molybdenum, silver, titanium, copper, aluminum, or alloys thereof. The transparent conductive layer may contain transparent conductive oxide such as indium tin oxide (ITO), indium zinc oxide (IZO), zinc oxide (ZnO), or indium zinc tin oxide (IZTO). In addition, the transparent conductive layer may contain a conductive polymer such as PEDOT, a metal nanowire, graphene, and the like.

The conductive layer with the multi-layer structure may include metal layers. The metal layers may have, for example, a three-layer structure of titanium/aluminum/titanium. The conductive layer with the multi-layer structure may include at least one metal layer and at least one transparent conductive layer.

At least one of the sensing insulating layer 203 and the cover insulating layer 205 may include an inorganic film. The inorganic film may contain at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. The organic film may contain at least one of an acryl-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 5:
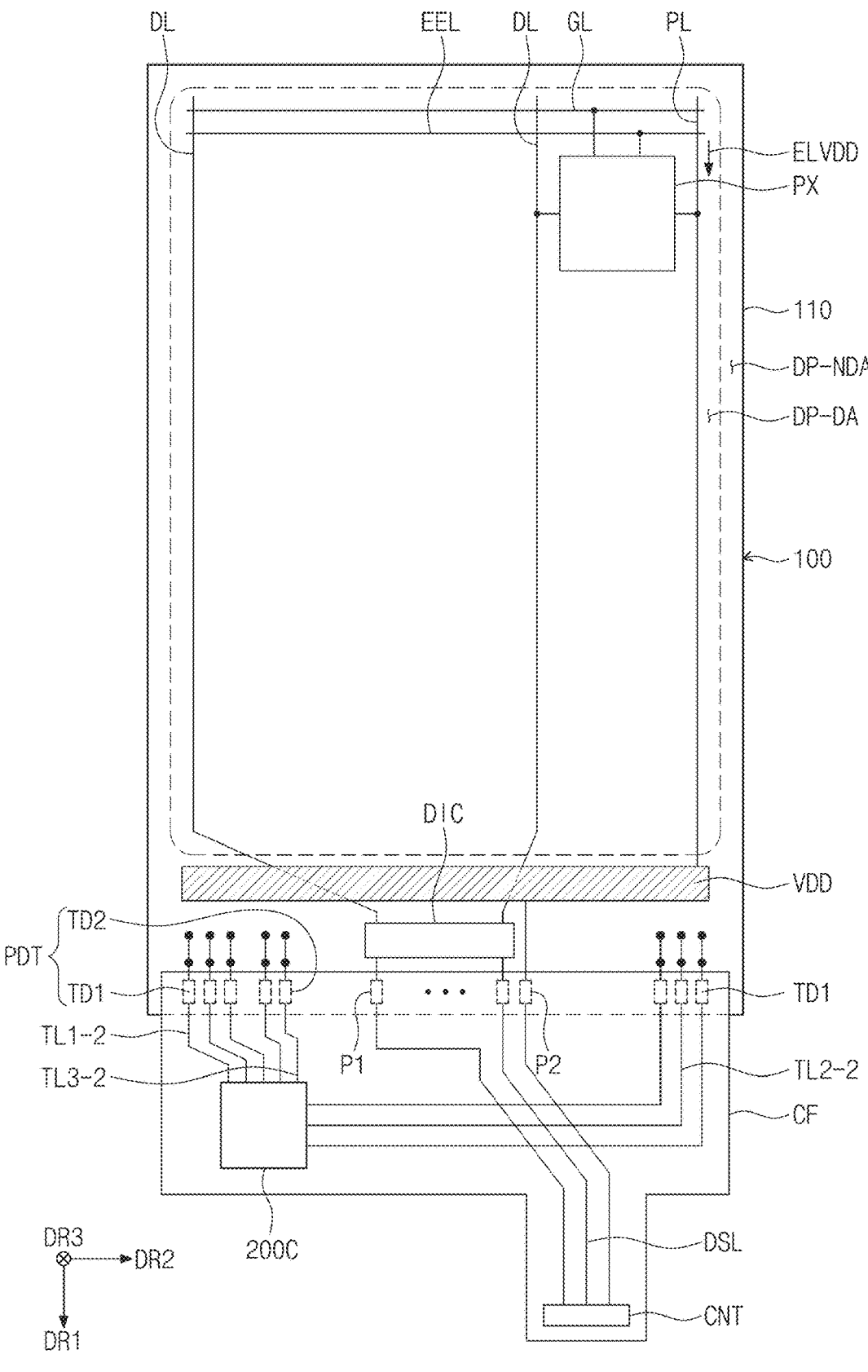
FIG. 5 is a top view of a display layer, a flexible substrate, and a sensor driver according to an embodiment of the present disclosure.

FIG. 5 is a top view of a display layer, a flexible substrate, and a sensor driver according to an embodiment of the present disclosure.

Referring to FIG. 5, the electronic device 1000 (see FIG. 1) may include the display layer 100, a power pattern VDD, a data driver DIC, a flexible circuit board CF, the sensor driver 200C, a display signal line DSL, a first-second line TL1-2, a second-second line TL2-2, a third-second line TL3-2, and a connector CNT.

In the display layer 100, a display area DP-DA and a non-display area DP-NDA disposed adjacent to the display area DP-DA may be defined. The display area DP-DA may be an area where the image is displayed. A plurality of pixels PX may be disposed in the display area DP-DA. The non-display area DP-NDA may be an area where a driving circuit, a driving wire, or the like is disposed.

The display layer 100 may include the base layer 110, the plurality of pixels PX, a plurality of signal wires GL, DL, PL, and EEL, a plurality of display pads P1 and P2, and a plurality of sensing pads PDT.

Each of the plurality of pixels PX may display one of primary colors or one of mixed colors. The primary colors may include red, green, or blue. The mixed colors may include various colors such as white, yellow, cyan, or magenta. However, the color rendered by each pixel PX is not limited thereto.

The plurality of signal wires GL, DL, PL, and EEL may be disposed on the base layer 110. The plurality of signal wires GL, DL, PL, and EEL may be connected to the plurality of pixels PX and transmit electrical signals to the plurality of pixels PX. The plurality of signal wires GL, DL, PL, and EEL may include the plurality of scan wires GL, the plurality of data wires DL, the plurality of power lines PL, and the plurality of light emission control wires EEL. However, this is an example, and the components of the plurality of signal wires GL, DL, PL, and EEL according to one embodiment of the present disclosure are not limited thereto. For example, the plurality of signal wires GL, DL, PL, and EEL according to one embodiment of the present disclosure may further include an initialization voltage wire.

The power pattern VDD may be disposed in the non-display area DP-NDA. The power pattern VDD may be connected to the plurality of power lines PL. Each of the plurality of pixels PX may receive a power voltage ELVDD provided by the power line PL.

The plurality of display pads P1 and P2 may be disposed in the non-display area DP-NDA. The plurality of display pads P1 and P2 may include the first pad P1 and the second pad P2. The first pad P1 may include a plurality of first pads. The plurality of first pads P1 may be respectively connected to the plurality of data wires DL. The second pad P2 may be connected to the power pattern VDD and electrically connected to the plurality of power lines PL. The display layer 100 may provide the electrical signals provided from the outside to the plurality of pixels PX via the plurality of display pads P1 and P2. In one example, the plurality of display pads P1 and P2 may further include pads for receiving other electrical signals in addition to the first pad P1 and the second pad P2, and the present disclosure may not be limited to any one embodiment.

The data driver DIC may be mounted in the non-display area DP-NDA on the display layer 100. The data driver DIC may be a chip-type timing control circuit. The data driver DIC may output a gray level voltage to the plurality of data lines DL in response to frame data of the image data RGB (see FIG. 2). The data driver DIC may drive the display layer 100. The plurality of data wires DL may be electrically connected to the plurality of first pads P1, respectively, via the data driver DIC. However, this is an example, and the data driver DIC according to one embodiment of the present disclosure may be mounted on a film separate from the display layer 100. The data driver DIC may be electrically connected to the plurality of display pads P1 and P2 via the film.

The plurality of sensing pads PDT may be disposed in the non-display area DP-NDA. The plurality of sensing pads PDT may be electrically connected to a plurality of sensing electrodes SP of the sensor layer 200 (see FIG. 6), respectively. The plurality of sensing pads PDT may include a plurality of first sensing pads TD1 and a plurality of second sensing pads TD2.

The flexible circuit board CF may be electrically connected to the plurality of display pads P1 and P2 and the plurality of sensing pads PDT. In other words, the flexible circuit board CF may be electrically connected to the display layer 100 and the sensor layer 200.

The sensor driver 200C may be disposed on the flexible circuit board CF. The sensor driver 200C may drive the sensor layer 200 (see FIG. 6). The sensor driver 200C may be electrically connected to the plurality of sensing pads PDT.

The connector CNT may electrically connect the controller 1000C (see FIG. 2) with the display layer 100. The connector CNT may be disposed on the flexible circuit board CF.

The display signal line DSL may be disposed between and electrically connected to the display layer 100 and the controller 1000C (see FIG. 2). For example, the display signal line DSL may be disposed between and connected to the plurality of display pads P1 and P2 and the connector CNT. In other words, the display signal line DSL may be electrically connected to the data driver DIC. The display signal line DSL may transmit and receive a signal for controlling the display layer 100. The display signal line DSL may be disposed on the flexible circuit board CF. The display signal line DSL may be a mobile industry processor interface (MIP1) wire.

Figure 6:
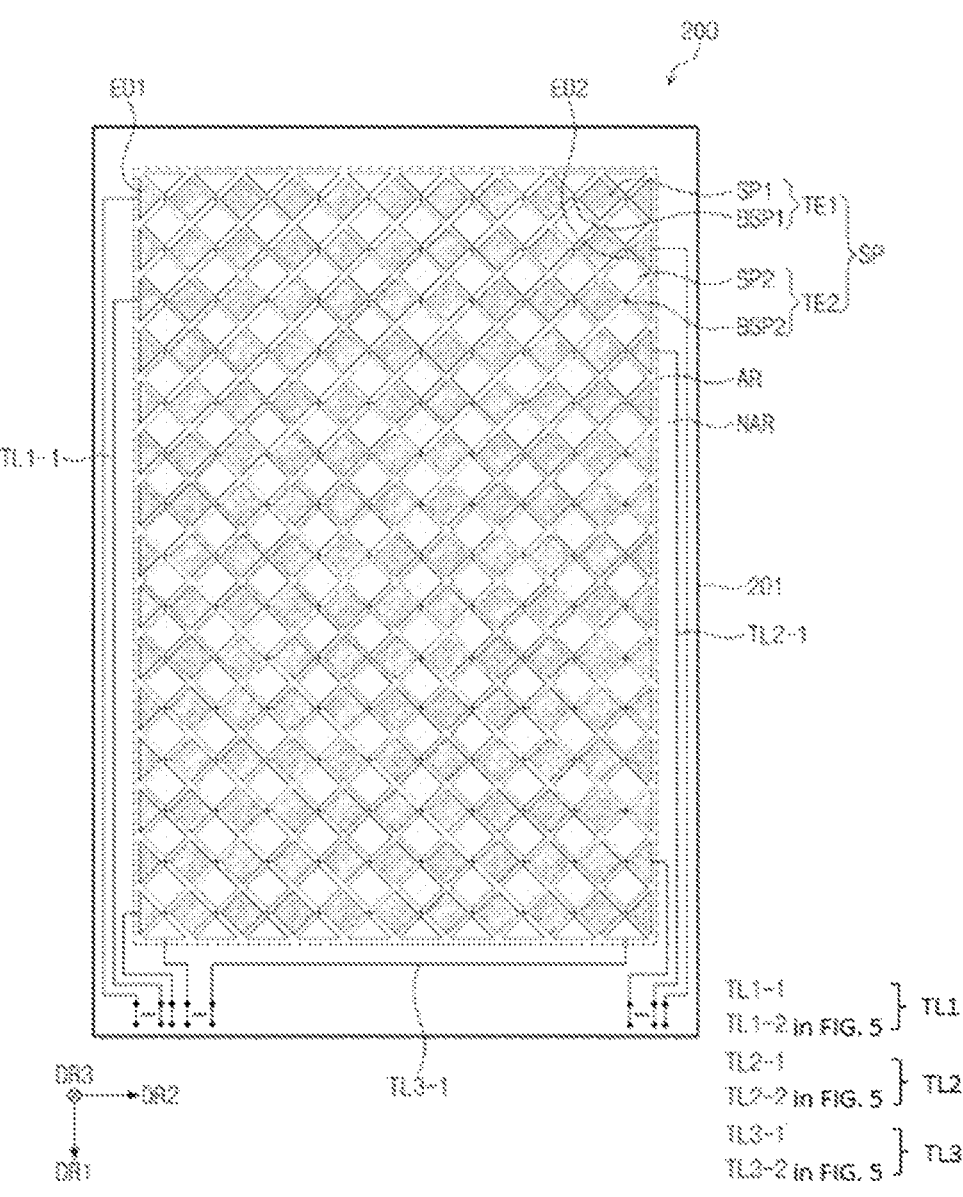
FIG. 6 is a top view of a sensor layer according to an embodiment of the present disclosure.

FIG. 6 is a top view of a sensor layer according to an embodiment of the present disclosure.

Referring to FIGS. 5 and 6, the sensor layer 200 may have an active area AR and a peripheral area NAR disposed adjacent to the active area AR. The active area AR may be an area that is activated in response to the electrical signal. The active area AR may be an area that senses an input. The active area AR may overlap the display area DP-DA of the display layer 100. The peripheral area NAR may overlap the non-display area DP-NDA of the display layer 100.

The sensor layer 200 may include the base insulating layer 201, the plurality of sensing electrodes SP, a plurality of first-first lines TL1-1, a plurality of second-first lines TL2-1, and a plurality of third-first lines TL3-1. The plurality of sensing electrodes SP may be disposed in the active area AR, and the plurality of first-first lines TL1-1, the plurality of second-first lines TL2-1, and the plurality of third-first lines TL3-1 may be disposed in the peripheral area NAR.

The base insulating layer 201 may be formed directly on the display layer 100. Alternatively, the base insulating layer 201 may be coupled to the display layer 100 via an adhesive member.

The plurality of sensing electrodes SP may include a plurality of first sensing electrodes TE1 and a plurality of second sensing electrodes TE2. The plurality of second sensing electrodes TE2 may intersect the plurality of first sensing electrodes TE1 with an insulating layer disposed therebetween.

Each of the plurality of first sensing electrodes TEL may extend along the second direction DR2, and the plurality of first sensing electrodes TE1 may be arranged along the first direction DR1. Each of the plurality of first sensing electrodes TE1 may include a plurality of first sensing patterns SP1 and a plurality of first connection patterns BSP1. Each of the plurality of first connection patterns BSP1 may electrically connect first sensing patterns SP1 disposed adjacent to each other in the second direction DR2. The plurality of first sensing patterns SP1 and the plurality of first connection patterns BSP1 may have a mesh structure. The plurality of first sensing patterns SP1 may be referred to as the plurality of first sensing portions SP1. The plurality of first connection patterns BSP1 may be referred to as the plurality of first connection portions BSP1. The plurality of first sensing electrodes TE1 may be referred to as a plurality of sensing electrodes.

Each of the plurality of first sensing electrodes TE1 may have one end ED1 and the other end ED2 spaced apart from the one end ED1 in the second direction DR2 defined therein.

At least some of the plurality of first sensing electrodes TE1 may be respectively connected to a plurality of first trace lines TL1. For example, at least some of the plurality of first sensing electrodes TE1 may be the plurality of first sensing electrodes TE1 arranged in odd-numbered rows. Each of the plurality of first trace lines TL1 may be in contact with the one end ED1 of each of at least some of the plurality of first sensing electrodes TE1.

The remainder of the plurality of first sensing electrodes TE1 may be respectively connected to a plurality of second trace lines TL2. For example, the remainder of the plurality of first sensing electrodes TE1 may be the plurality of first sensing electrodes TE1 arranged in even-numbered rows. Each of the plurality of second trace lines TL2 may be in contact with the other end ED2 of each of the plurality of first sensing electrodes TE1. At least some of the plurality of first sensing electrodes TE1 and the remainder of the plurality of first sensing electrodes TE1 may be alternately arranged.

Each of the plurality of second sensing electrodes TE2 may extend along the first direction DR1, and the plurality of second sensing electrodes TE2 may be arranged along the second direction DR2. Each of the plurality of second sensing electrodes TE2 may include a plurality of second sensing patterns SP2 and a plurality of second connection patterns BSP2. Each of the plurality of second connection patterns BSP2 may electrically connect second sensing patterns SP2 disposed adjacent to each other in the first direction DR1. The plurality of second sensing patterns SP2 and the plurality of second connection patterns BSP2 may have a mesh structure. The plurality of second sensing patterns SP2 may be referred to as the plurality of second sensing portions SP2. The plurality of second connection patterns BSP2 may be referred to as the plurality of second connection portions BSP2.

The plurality of first connection patterns BSP1 may be arranged in a different layer from the plurality of second connection patterns BSP2. The plurality of second connection patterns BSP2 may intersect the plurality of first sensing electrodes TE1 with an insulating layer disposed therebetween. For example, the plurality of first connection patterns BSP1 may respectively intersect the plurality of second connection patterns BSP2 with an insulating layer disposed therebetween. For example, the plurality of first sensing patterns SP1, the plurality of first connection patterns BSP1, and the plurality of second sensing patterns SP2 may be formed of the second conductive layer 204 (see FIG. 4), and the plurality of second connection patterns BSP2 may be formed of the first conductive layer 202 (see FIG. 4).

The plurality of second sensing electrodes TE2 may be respectively connected to a plurality of third trace lines TL3.

It is shown as an example in FIG. 6 that the plurality of sensing electrodes SP has a square shape, but the present disclosure is not limited thereto. For example, the plurality of sensing electrodes SP may have a polygonal shape.

The plurality of sensing electrodes SP may contain a conductive material. For example, the conductive material may include metals or alloys thereof. The metals may include gold (Au), silver (Ag), aluminum (Al), molybdenum (Mo), chromium (Cr), titanium (Ti), nickel (Ni), neodymium (Nd), copper (Cu), platinum (Pt), and the like. However, this is an example, and the plurality of sensing electrodes SP may be made of a transparent conductive material. The transparent conductive material may be a silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), a carbon nano tube, graphene, and the like. The plurality of sensing electrodes SP may be composed of a single layer or multiple layers.

The plurality of first trace lines TL1 may include the plurality of first-first lines TL1-1 and the plurality of first-second lines TL1-2.

Each of the plurality of first-first lines TL1-1 may be electrically connected to the one end ED1 of each of the plurality of first sensing electrodes TE1 arranged in the odd-numbered rows. The one end ED1 may refer to a portion of each of the plurality of first sensing electrodes TE1 arranged adjacent to a left side of the peripheral area NAR defined in the sensor layer 200. That is, each of the plurality of first-first lines TL1-1 may be electrically connected to the one end ED1 of each of at least some of the plurality of first sensing electrodes TE1, and the plurality of first-first lines TL1-1 may be arranged at one side of the peripheral area NAR. For example, the plurality of first-first lines TL1-1 may be arranged at the left side of the peripheral area NAR.

The plurality of first-first lines TL1-1 may be electrically connected to the plurality of first sensing pads TD1, respectively, via contact holes. That is, the plurality of first-first lines TL1-1 may be disposed between and electrically connected to the plurality of sensing electrodes SP and the plurality of first sensing pads TD1.

The plurality of first-second lines TL1-2 may extend from the plurality of first-first lines TL1-1. The plurality of first-second lines TL1-2 may be disposed between and electrically connected to the sensor layer 200 and the sensor driver 200C. For example, the plurality of first-second lines TL1-2 may be disposed between and connected to the plurality of first sensing pads TD1 and the sensor driver 200C. In other words, the sensor driver 200C may be electrically connected to the plurality of first trace lines TL1. The plurality of first-second lines TL1-2 may be disposed on the flexible circuit board CF.

Figure 8:
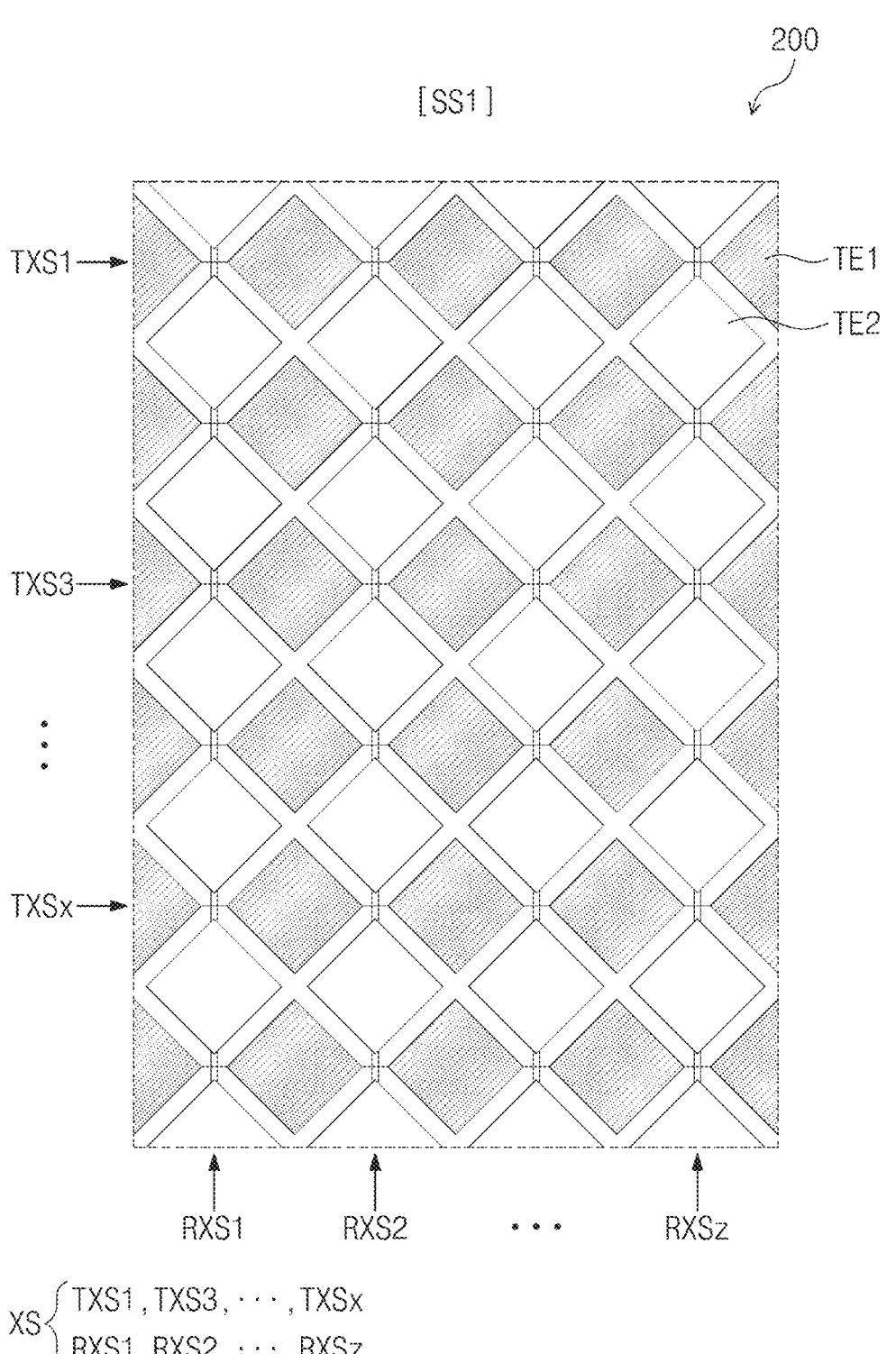
FIG. 8 is a diagram for illustrating an operation of a sensor layer according to an embodiment of the present disclosure.
Figure 9:
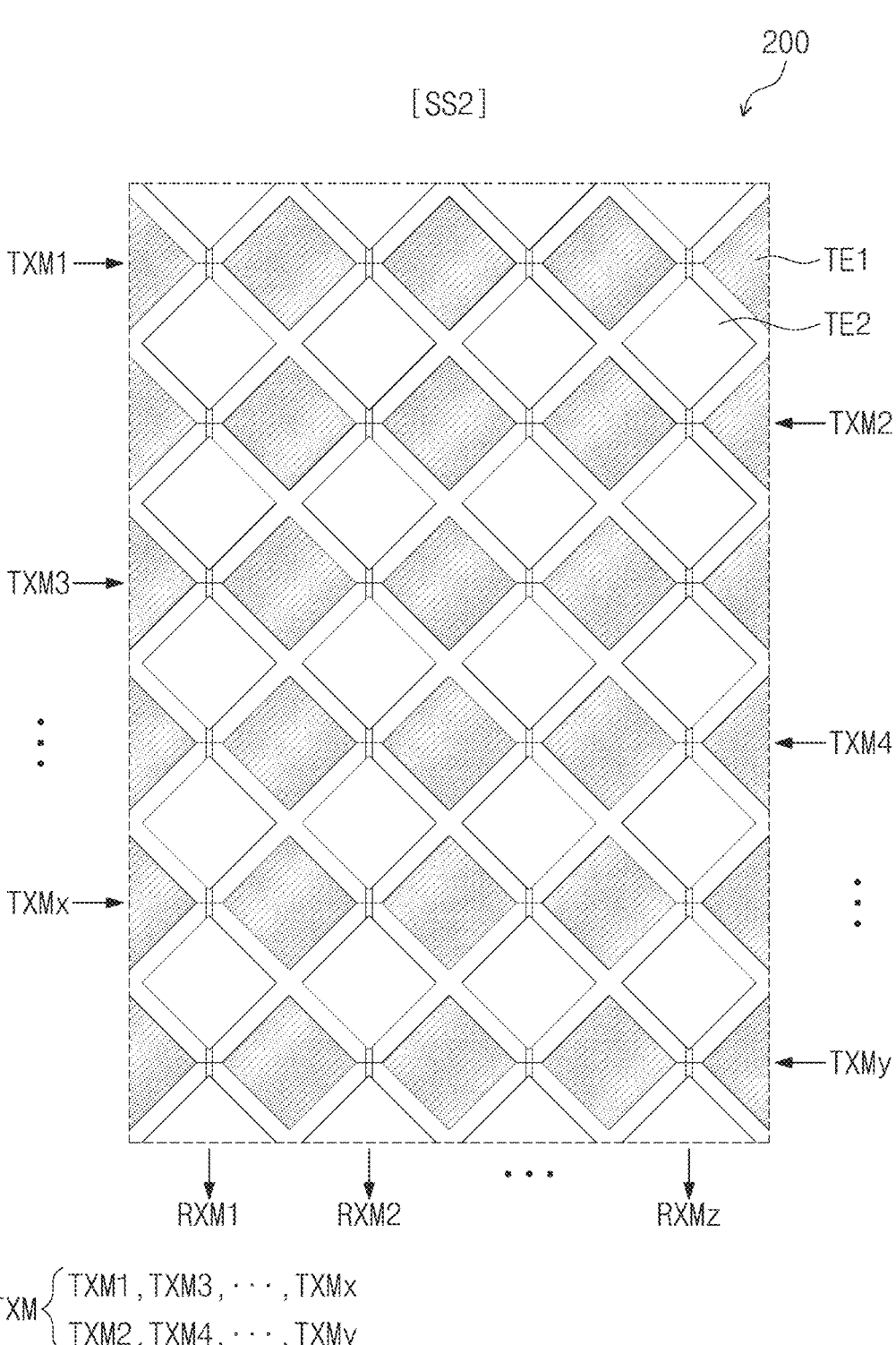
FIG. 9 is a diagram for illustrating an operation of a sensor layer according to an embodiment of the present disclosure.

The plurality of first trace lines TL1 may transmit and receive a driving signal XS (see FIG. 8) or may transmit a transmission signal TXM (see FIG. 9). When viewed on a plane, the plurality of first trace lines TL1 may not be overlapped with the display signal line DSL. That is, when viewed on a plane, the plurality of first trace lines TL1 may be arranged to be spaced apart from the display signal line DSL.

The plurality of second trace lines TL2 may include the plurality of second-first lines TL2-1 and the plurality of second-second lines TL2-2.

Each of the plurality of second-first lines TL2-1 may be electrically connected to the other end ED2 of each of the plurality of first sensing electrodes TE1 arranged in the even-numbered rows. The other end ED2 may refer to a portion of each of the plurality of first sensing electrodes TE1 arranged adjacent to a right side of the peripheral area NAR defined in the sensor layer 200. That is, each of the plurality of second-first lines TL2-1 may be electrically connected to the other end ED2 of each of the remainder of the plurality of first sensing electrodes TE1, and the plurality of second-first lines TL2-1 may be disposed at the other side spaced apart from the one side of the peripheral area NAR where the plurality of first-first lines TL1-1 are arranged in the second direction DR2. For example, the plurality of second-first lines TL2-1 may be arranged at the right side of the peripheral area NAR.

The plurality of second-first lines TL2-1 may be electrically connected to the plurality of first sensing pads TD1, respectively, via contact holes. That is, the plurality of second-first lines TL2-1 may be disposed between and electrically connected to the plurality of sensing electrodes SP and the plurality of first sensing pads TD1.

The plurality of second-second lines TL2-2 may extend from the plurality of second-first lines TL2-1. The plurality of second-second lines TL2-2 may be disposed between and electrically connected to the sensor layer 200 and the sensor driver 200C. For example, the plurality of second-second lines TL2-2 may be disposed between and connected to the plurality of first sensing pads TD1 and the sensor driver 200C. In other words, the sensor driver 200C may be electrically connected to the plurality of second trace lines TL2. The plurality of second-second lines TL2-2 may be disposed on the flexible circuit board CF.

The plurality of second trace lines TL2 may transmit the transmission signal TXM (see FIG. 9). When viewed on a plane, the plurality of second trace lines TL2 may be overlapped with the display signal line DSL. An interference capacitor may be formed between the plurality of second trace lines TL2 and the display signal line DSL.

Unlike the present disclosure, when the plurality of second trace lines TL2 are not disposed and the plurality of first trace lines TL1 are respectively connected to all of the plurality of first sensing electrodes TE1, all of the plurality of first trace lines TL1 may be disposed on a left side of the display area DP-DA in the peripheral area NAR, so that the peripheral area NAR on a left side of the display area DP-DA may increase. However, according to the present disclosure, some of the plurality of first sensing electrodes TE1 may be connected to the plurality of second trace lines TL2 disposed on a right side of the display area DP-DA in the peripheral area NAR and connected to the sensing pads PDT. The plurality of first trace lines TL1, the plurality of second trace lines TL2, and the plurality of third trace lines TL3 may be arranged in the peripheral area NAR in a distributed manner. The electronic device 1000 (see FIG. 1) with a reduced peripheral area NAR may be provided.

The plurality of third trace lines TL3 may include the plurality of third-first lines TL3-1 and the plurality of third-second lines TL3-2.

The plurality of third-first lines TL3-1 may be electrically connected to the plurality of second sensing electrodes TE2, respectively. The plurality of third-first lines TL3-1 may be electrically connected to the plurality of second sensing pads TD2, respectively, via contact holes. That is, the plurality of third-first lines TL3-1 may be disposed between and electrically connected to the plurality of sensing electrodes SP and the plurality of second sensing pads TD2. The plurality of third-first lines TL3-1 may be disposed adjacent to the plurality of first-first lines TL1-1. For example, when viewed on a plane, the contact hole of the plurality of third-first lines TL3-1 may be defined between the data driver DIC and the plurality of first-first lines TL1-1.

The plurality of third-second lines TL3-2 may extend from the plurality of third-first lines TL3-1. The plurality of third-second lines TL3-2 may be disposed between and electrically connected to the sensor layer 200 and the sensor driver 200C. For example, the plurality of third-second lines TL3-2 may be disposed between and connected to the plurality of second sensing pads TD2 and the sensor driver 200C. In other words, the sensor driver 200C may be electrically connected to the plurality of third trace lines TL3.

The plurality of third-second lines TL3-2 may be disposed on the flexible circuit board CF, the plurality of third-second lines TL3-2 may be arranged adjacent to the plurality of first-second lines TL1-2. For example, on the flexible circuit board CF, the plurality of third-second lines TL3-2 may be placed on a right side of the plurality of first-second lines TL1-2.

The plurality of third trace lines TL3 may transmit and receive the driving signal XS (see FIG. 8) or may transmit the transmission signal TXM (see FIG. 9). When viewed on a plane, the plurality of third trace lines TL3 may not be overlapped with the display signal line DSL. That is, when viewed on a plane, the plurality of third trace lines TL3 may be arranged to be spaced apart from the display signal line DSL.

Unlike the present disclosure, the plurality of third trace lines may be arranged to be divided into two groups with the data driver DIC interposed between. In this case, third trace lines arranged on a right side of the data driver DIC may be overlapped with the display signal line DSL when being connected to the sensor driver 200C. As a result, a signal of the display signal line DSL may be transmitted as noise to signals transmitted via the plurality of third trace lines because of the interference capacitor formed between the plurality of third trace lines and the display signal line DSL. However, according to the present disclosure, all of the plurality of third trace lines TL3 may be arranged adjacent to the plurality of first trace lines TL1. When viewed on a plane, a size of an area where the plurality of first trace lines TL1, the plurality of second trace lines TL2, and the plurality of third trace lines TL3 are overlapped with the display signal line DSL may be reduced. Signals transmitted via the plurality of first trace lines TL1, the plurality of second trace lines TL2, and the plurality of third trace lines TL3 may be less affected by the interference capacitor. Accordingly, the electronic device 1000 (see FIG. 1) with improved sensing reliability may be provided.

Unlike the present disclosure, when the driving signal XS (see FIG. 8) is transmitted and received via the plurality of second trace lines TL2 in the sensor layer 200 that operates in a self-touch scheme, the signal of the display signal line DSL may be transmitted as a noise signal to the plurality of second trace lines TL2 because of the interference capacitor. However, according to the present disclosure, in the sensor layer 200 that operates in the self-touch scheme, the driving signal XS (see FIG. 8) may be transmitted and received only via the plurality of first trace lines TL1 and the plurality of third trace lines TL3 which are not overlapped with the display signal line DSL. Accordingly, the noise signal may be prevented from occurring. Accordingly, the electronic device 1000 (see FIG. 1) with the improved sensing reliability may be provided.

Figure 7:
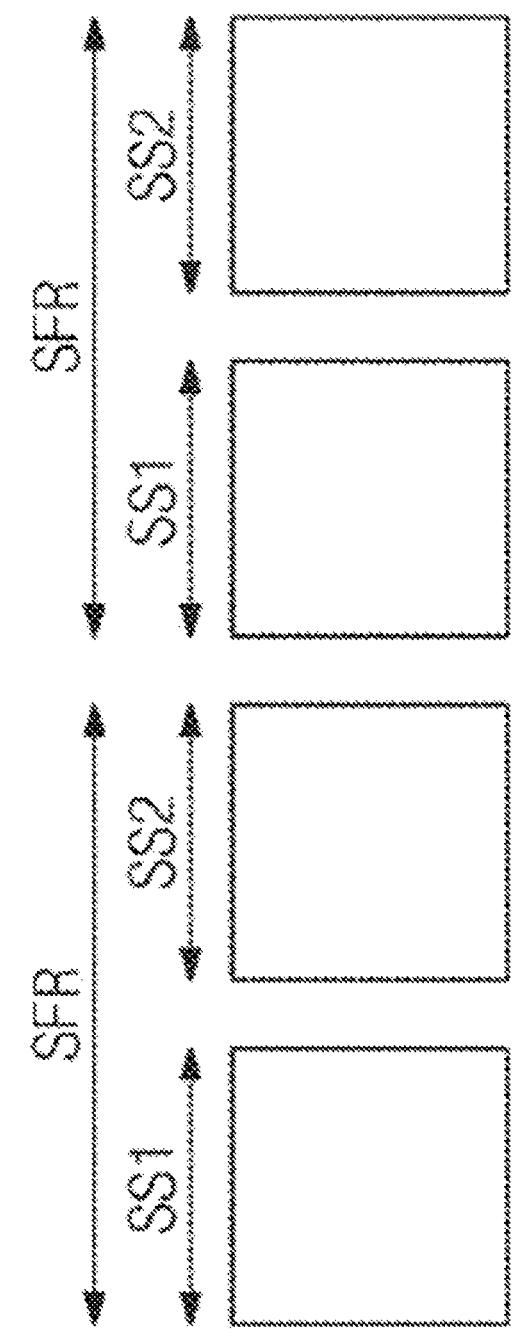
FIG. 7 is a conceptual diagram for illustrating an operation of a sensor driver according to an embodiment of the present disclosure.

FIG. 7 is a conceptual diagram for illustrating an operation of a sensor driver according to an embodiment of the present disclosure. FIGS. 8 and 9 are diagrams for illustrating an operation of a sensor layer according to an embodiment of the present disclosure.

Referring to FIGS. 6 to 9, the sensor layer 200 may operate in units of a sensing frame SFR. The sensing frame SFR may include a first section SS1 and a second section SS2. The second section SS2 may proceed after the first section SS1.

The first section SS1 may be a section that operates in the self-touch scheme. During the first section SS1, the sensor driver 200C may output the driving signal XS. The driving signal XS may include a plurality of first-first sensing signals TXS1 and TXS3 to TXSx and a plurality of first-second sensing signals RXS1 and RXS2 to RXSz.

The sensor driver 200C may output the plurality of first-first sensing signals TXS1 and TXS3 to TXSx to the plurality of first sensing electrodes TE1 arranged in the odd-numbered rows, respectively. That is, the plurality of first-first sensing signals TXS1 and TXS3 to TXSx may be provided to the plurality of first trace lines TL1 during the first section SS1.

The sensor driver 200C may output the plurality of first-second sensing signals RXS1 and RXS2 to RXSz to the plurality of second sensing electrodes TE2, respectively. That is, the plurality of first-second sensing signals RXS1 and RXS2 to RXSz may be provided to the plurality of third trace lines TL3 during the first section SS1.

The sensor driver 200C may not output the driving signal XS to the plurality of second trace lines TL2 disposed in the even-numbered rows.

The sensor layer 200 may sense the input by the touch of the user's body 2000 (see FIG. 2) as the plurality of first sensing electrodes TE1 and the plurality of second sensing electrodes TE2 are integrated into one electrode. In this regard, the sensor layer 200 may be defined as operating in the self-touch scheme. During the first section SS1, some of the first sensing electrodes TEL and the second sensing electrodes TE2 may operate in the self-touch scheme. The sensor layer 200 may detect the input based on a change in capacitance of each of the plurality of first electrodes TE1 and a change in capacitance of each of the plurality of second electrodes TE2.

According to the present disclosure, when the sensor layer 200 operates in the self-touch scheme, the driving signal XS may be provided only to the plurality of first trace lines TL1 and the plurality of third trace lines TL3. Because the plurality of first trace lines TL1 and the plurality of third trace lines TL3 are not overlapped with the display signal line DSL (see FIG. 5), the noise signal may be reduced or eliminated. The driving signal XS may not be provided to the plurality of second trace lines TL2 where the noise may occur by the interference capacitor formed between the display signal line DSL (see FIG. 5) and the plurality of second trace lines TL2. Accordingly, the electronic device 1000 (see FIG. 1) with the improved sensing reliability may be provided.

The second section SS2 may be a section that operates in a mutual-touch scheme. During the second section SS2, the sensor driver 200C may transmit the transmission signal TXM and receive a reception signal RXM generated based on the transmission signal TXM. The transmission signal TXM may include a plurality of second-first sensing signals TXM1 and TXM3 to TXMx and a plurality of second-second sensing signals TXM2 and TXM4 to TXMy. The reception signal RXM may include a plurality of second-third sensing signals RXM1 and RXM2 to RXMz.

The sensor driver 200C may transmit the plurality of second-first sensing signals TXM1 and TXM3 to TXMx to the plurality of first sensing electrodes TE1 arranged in the odd-numbered rows, respectively, and transmit the plurality of second-second sensing signals TXM2 and TXM4 to TXMy to the plurality of first sensing electrodes TE1 arranged in the even-numbered rows, respectively. During the second section SS2, the transmission signal TXM may be provided to the plurality of first trace lines TL1 and the plurality of second trace lines TL2.

The plurality of second-third sensing signals RXM1 and RXM2 to RXMz may be generated based on the plurality of second-first sensing signals TXM1 and TXM3 to TXMx and the plurality of second-second sensing signals TXM2 and TXM4 to TXMy.

The sensor driver 200C may receive the plurality of second-third sensing signals RXM1 and RXM2 to RXMz from the plurality of second sensing electrodes TE2, respectively. During the second section SS2, the reception signal RXM generated based on the transmission signal TXM may be provided to the plurality of third trace lines TL3.

The sensor driver 200C may output the coordinate signal I-SS (see FIG. 2) derived based on the plurality of second-third sensing signals RXM1 and RXM2 to RXMz to the controller 1000C (see FIG. 2).

The sensor layer 200 may sense the input by the touch of the user's body 2000 (see FIG. 2) as the plurality of first sensing electrodes TE1 and the plurality of second sensing electrodes TE2 are capacitively coupled to each other. In this regard, the sensor layer 200 may be defined as operating in the mutual-touch scheme. During the second section SS2, the plurality of first sensing electrodes TE1 and the plurality of second sensing electrodes TE2 may be driven in the mutual touch scheme.

Unlike the present disclosure, when the sensor driver 200C receives the reception signal RXM via the plurality of second trace lines TL2 which are overlapped with the display signal line DSL (see FIG. 5) in a plan view, the signal provided to the display signal line DSL (see FIG. 5) may be sensed by acting as the noise signal on the reception signal RXM by the interference capacitor formed between the display signal line DSL (see FIG. 5) and the plurality of second trace lines TL2. However, according to the present disclosure, when the sensor layer 200 operates in the mutual-touch scheme, the transmission signal TXM may be transmitted via the plurality of first trace lines TL1 and the plurality of second trace lines TL2. The sensor driver 200C may receive the reception signal RXM via the plurality of third trace lines TL3 which are not overlapped with the display signal line DSL (see FIG. 5) in a plan view. Even when the signal provided to the display signal line DSL (see FIG. 5) is transmitted as the noise signal to the transmission signal TXM because of the interference capacitor formed between the display signal line DSL (see FIG. 5) and the plurality of second trace lines TL2, an influence of the noise signal may be reduced or eliminated on the reception signal RXM because the third trace lines TL3 are not overlapped with the display signal line DSL. Accordingly, the sensor driver 200C may output the coordinate signal I-SS (see FIG. 2) derived based on the reception signal RXM that does not contain the noise signal to the controller 1000C (see FIG. 2). Accordingly, the electronic device 1000 (see FIG. 1) with the improved sensing reliability may be provided.

Hereinabove, although the description has been made with reference to one embodiment of the present disclosure, those skilled in the art or those of ordinary skill in the art will understand that the present disclosure may be variously modified and changed within the scope without departing from the spirit and technical scope of the present disclosure described in the claims to be described later. Accordingly, the technical scope of the present disclosure should not be limited to the content described in the detailed description of the specification, but should be defined by the claims.

As described above, when the sensor layer operates in the self-touch scheme, the driving signal may be provided only to the plurality of first trace lines and the plurality of third trace lines. Because the plurality of first trace lines and the plurality of third trace lines are not overlapped with the display signal line, the noise signal may be reduced or eliminated. The driving signal may not be provided to the plurality of second trace lines where the noise may occur by the interference capacitor formed between the display signal line and the plurality of second trace lines. Therefore, the electronic device with the improved sensing reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display layer; and a sensor layer disposed on the display layer and including an active area and a peripheral area disposed adjacent to the active area, wherein the sensor layer includes:

a plurality of first sensing electrodes extending along a second direction, each of the plurality of first sensing electrodes including one end and the other end spaced apart from each other in the second direction;

a plurality of second sensing electrodes extending along a first direction intersecting the second direction;

a plurality of first trace lines, each of the plurality of first trace lines being electrically connected to the one end of each of at least some of the plurality of first sensing electrodes;

a plurality of second trace lines, each of the plurality of second trace lines being electrically connected to the other end of each of a remainder of the plurality of first sensing electrodes; and a plurality of third trace lines electrically connected to the plurality of second sensing electrodes, respectively, wherein the at least some of the plurality of first sensing electrodes and the plurality of second sensing electrodes operate in a self-touch scheme during a first section of a sensing frame, and wherein a driving signal is provided only to the plurality of first trace lines and the plurality of third trace lines during the first section of the sensing frame.

2. The electronic device of claim 1, further comprising:

a data driver configured to drive the display layer;

a sensor driver configured to drive the sensor layer; and a display signal line electrically connected to the data driver and transmitting a signal for controlling the display layer, wherein the sensor driver is electrically connected to the plurality of second trace lines, and wherein the plurality of second trace lines are overlapped with the display signal line in a plan view.

3. The electronic device of claim 2, wherein the sensor driver is electrically connected to the plurality of first trace lines, and wherein the plurality of first trace lines are not overlapped with the display signal line in a plan view.

4. The electronic device of claim 2, wherein the sensor driver is electrically connected to the plurality of third trace lines, and wherein the plurality of third trace lines are not overlapped with the display signal line in a plan view.

5. The electronic device of claim 2, further comprising:

a flexible circuit board electrically connected to the display layer and the sensor layer, wherein the display signal line and the sensor driver are disposed on the flexible circuit board.

6. The electronic device of claim 5, wherein the plurality of first trace lines include:

first-first lines each connected to the one end of each of the at least some of the plurality of first sensing electrodes; and first-second lines extending respectively from the first-first lines and connected to the sensor driver, wherein the first-first lines are arranged in the peripheral area, and wherein the first-second lines are arranged on the flexible circuit board.

7. The electronic device of claim 1, wherein the plurality of first sensing electrodes are driven in a mutual-touch scheme during a second section of the sensing frame following the first section of the sensing frame.

8. The electronic device of claim 7, wherein a transmission signal is provided to the plurality of first trace lines and the plurality of second trace lines during the second section, and wherein a reception signal generated based on the transmission signal is provided to the plurality of third trace lines.

9. The electronic device of claim 1, wherein the at least some of the plurality of first sensing electrodes and the remainder of the plurality of first sensing electrodes are alternately arranged along the first direction.

10. The electronic device of claim 1, wherein a portion of each of the plurality of first trace lines is disposed at one side of the peripheral area.

11. The electronic device of claim 10, wherein a portion of each of the plurality of second trace lines is disposed at the other side of the peripheral area which is spaced apart from the one side of the peripheral area in the second direction.

12. The electronic device of claim 10, wherein a portion of each of the plurality of third trace lines is disposed adjacent to the portion of each of the plurality of first trace lines.

13. An electronic device comprising:

a display layer;

a data driver configured to drive the display layer;

a sensor layer disposed on the display layer;

a sensor driver configured to drive the sensor layer; and a display signal line electrically connected to the data driver, wherein the sensor layer includes:

a plurality of first sensing electrodes extending along a second direction, each of the plurality of first sensing electrodes including one end and the other end spaced apart from each other in the second direction;

a plurality of first trace lines, each of the plurality of first trace lines being electrically connected to one end of each of at least some of the plurality of first sensing electrodes; and a plurality of second trace lines, each of the plurality of second trace lines being electrically connected to the other end of each of a remainder of the plurality of first sensing electrodes, wherein the plurality of first trace lines and the plurality of second trace lines are connected to the sensor driver, wherein the plurality of second trace lines are overlapped with the display signal line in a plan view, wherein the plurality of first trace lines are not overlapped with the display signal line in a plan view, and wherein a driving signal is provided to the plurality of first trace lines during a first section of a sensing frame.

14. The electronic device of claim 13, wherein the at least some of the plurality of first sensing electrodes and the remainder of the plurality of first sensing electrodes are alternately arranged.

15. The electronic device of claim 13, further comprising:

a flexible circuit board electrically connected to the display layer and the sensor layer, wherein the display signal line and the sensor driver are disposed on the flexible circuit board.

16. The electronic device of claim 13, wherein the sensor layer further includes:

a plurality of second sensing electrodes extending along a first direction intersecting the second direction; and a plurality of third trace lines electrically connected to the plurality of second sensing electrodes, respectively, and wherein the driving signal is provided to the plurality of third trace lines during the first section.

17. The electronic device of claim 16, wherein the at least some of the plurality of first sensing electrodes and the plurality of second sensing electrodes operate in a self-touch scheme during the first section.

18. The electronic device of claim 16, wherein the plurality of third trace lines is spaced apart from the display signal line in a plan view.

19. The electronic device of claim 16, wherein the sensing frame further includes a second section following the first section, and wherein the plurality of first sensing electrodes are driven in a mutual-touch scheme during the second section.

20. The electronic device of claim 19, wherein a transmission signal is provided to the plurality of first trace lines and the plurality of second trace lines during the second section, and wherein a reception signal generated based on the transmission signal is provided to the plurality of third trace lines.

* * * * *